United States Patent [19]
Martin et al.

[11] Patent Number: 5,817,286
[45] Date of Patent: Oct. 6, 1998

[54] PROCESSES FOR THE SYNTHESIS OF HYDROGEN CYANIDE

[75] Inventors: Richard J. Martin; John D. Stilger, both of San Jose, Calif.; John D. Young, Falkirk, Scotland

[73] Assignee: Thermatrix Inc., San Jose, Calif.

[21] Appl. No.: 910,488

[22] Filed: Jul. 25, 1997

[51] Int. Cl.⁶ .................................................. C01C 3/02
[52] U.S. Cl. .......................................................... 423/375
[58] Field of Search ............................................ 423/375

[56] References Cited

U.S. PATENT DOCUMENTS

| | | | |
|---|---|---|---|
| 4,317,808 | 3/1982 | Voigt et al. | 423/375 |
| 4,320,104 | 3/1982 | Bittner et al. | 423/375 |
| 4,823,711 | 4/1989 | Kroneberger et al. | 110/236 |
| 4,853,190 | 8/1989 | Manner et al. | 422/197 |

*Primary Examiner*—Joseph McKane
*Assistant Examiner*—Joseph Murray
*Attorney, Agent, or Firm*—Woodcock Washburn Kurtz Mackiewicz & Norris LLP

[57] ABSTRACT

Processes for the production of hydrogen cyanide from the reaction of methane with ammonia at temperatures above about 800° C. where the reactor contains a matrix bed of heat resistant materials. The product stream produced within the reactor is preferably routed in a countercurrent fashion to the feed stream entering the reactor to preheat the feed stream and to lower the exit temperature of the product stream. Reactors capable of being used to practice such processes are also provided by the invention.

25 Claims, 5 Drawing Sheets

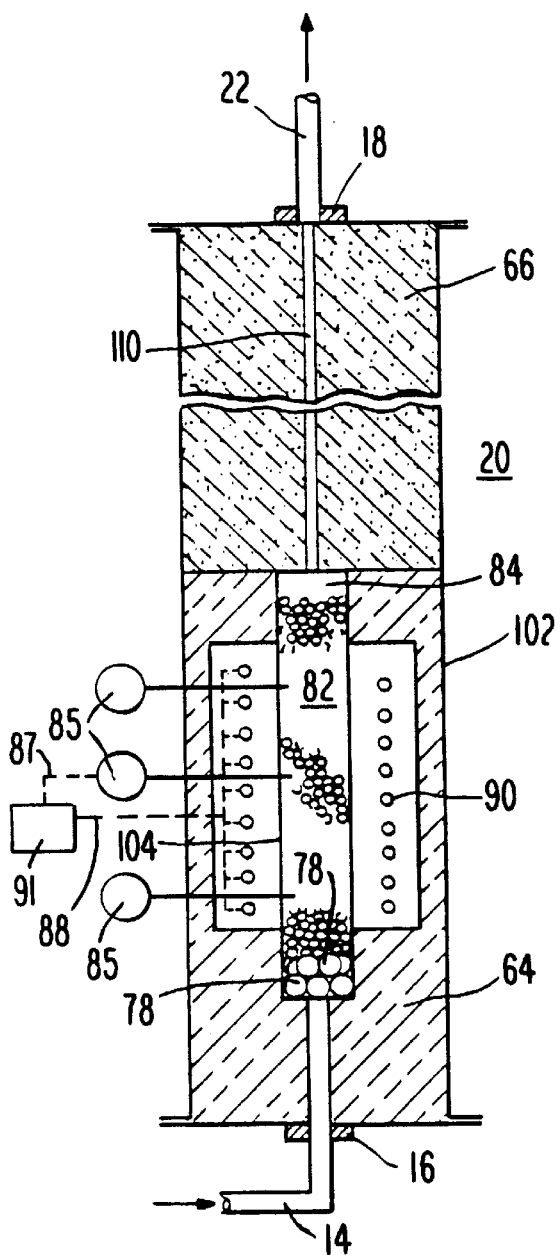
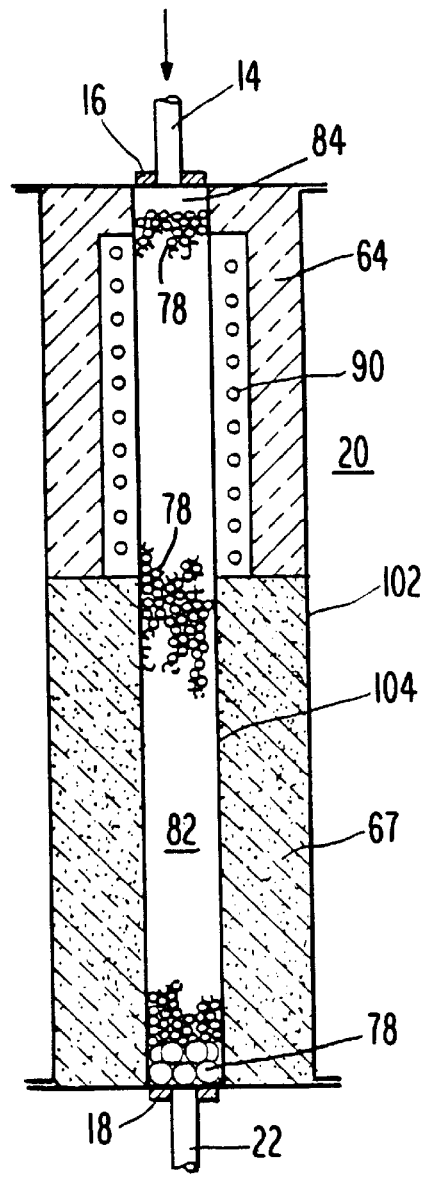
Fig. 6
Fig. 7

PROCESSES FOR THE SYNTHESIS OF HYDROGEN CYANIDE

FIELD OF THE INVENTION

The present invention relates to processes for the synthesis of hydrogen cyanide from the reaction of methane with ammonia. More particularly, the present invention relates to such processes that are conducted within a reactor that contains a matrix bed of heat resistant material.

BACKGROUND OF THE INVENTION

Several commercial processes exist for the production of hydrogen cyanide (HCN). The efficiency of each process is primarily dictated by balancing the yield of HCN, which is the effective conversion of the reactants to form hydrogen cyanide, with the concentration of HCN in the product gas. In general, this implicates balancing the cost of the raw reactant materials, typically methane ($CH_4$) and ammonia ($NH_3$), with the cost of separating HCN from the various components of the product gas. The economics of the various processes is also effected by the costs associated with any catalyst that may be required to selectively react the methane and ammonia and the costs associated with providing heat to the reaction if the process is endothermic in nature.

The first commercially significant process was the Andrussow process developed in the 1930s. The Andrussow process used a catalyst material that was a gauze containing a noble metal, such as platinum, to selectively react ammonia with methane at relatively high temperatures in the range of about 1100° C. and at about 2 atm pressure. The process is conducted in the presence of oxygen, and is exothermic such that it does not require external heating of the reactants. The yield of hydrogen cyanide is in the range of about 60% on a molar basis of the ammonia, $NH_3$, reactant (hereafter the percent yield for hydrogen cyanide is based on a $NH_3$ molar basis) and the concentration of hydrogen cyanide in the product stream is typically below about 8% by volume. The product gas contains HCN, $NH_3$, $CH_4$, $CO_2$, CO, and $H_2$.

The second commercially notable process for the production of HCN was the BMA process developed in the 1950s. The BMA process uses an array of noble metal, e.g. platinum, coated ceramic tubes to selectively react $NH_3$ with $CH_4$ at a relatively high temperature in the range of about 1200° C. within a furnace in the absence of oxygen. This process is endothermic and requires external heat to raise the temperature of the reactants to the process temperature. The yield of HCN for the BMA process is higher than that for the Andrussow process and is generally in the range of about 80%. The concentration of the HCN in the product gas is typically about 20% by volume. Practice with the BMA process has shown that the system is difficult to scale up for larger commercial reactors and is not a significant industrial process today.

A more recent process for the production of HCN is the Shawinigan process developed in the 1970s. This process does not use a catalyst, but rather reacts $NH_3$ with coal or coke particles in a fluidized bed that is externally heated to high reaction temperatures. The process reported results in HCN yields of about 85% and a concentration of HCN in the product gas of about 25% by volume. The disadvantages of the process is that it requires the handling of solid or particulate materials and problems arise with gas leaks that can allow HCN to escape from the reactor or allow air to enter the reactor. The energy consumption is also rather high due to the nature of the heating method.

Today, a need exists to develop a more efficient process for the synthesis and production of HCN. Such a process must be competitive to prior HCN process on an overall economic basis that includes (1) the cost of the raw materials, such as $CH_4$ and $NH_3$, (2) the cost of any catalyst, (3) the cost associated with the heating of the reactants to the temperature at which the reaction takes place, and (4) the cost for separating the HCN from the product gas.

SUMMARY OF THE INVENTION

The present invention provides processes for the production of hydrogen cyanide from the endothermic reaction of methane with ammonia wherein the reactor in which the hydrogen cyanide is produced contains a matrix bed of heat resistant materials. In a particularly preferred embodiment of the present invention, the product gas stream produced within the reactor is used to recuperatively pre-heat the feed stream within the reactor itself. In such a way, there is a substantial reduction in the amount of externally supplied heat that is required to elevate the temperature of the incoming feed stream to the reaction temperature. Thus, hydrogen cyanide can be economically produced in accordance with the claimed processes because the costs associated with heating the reactants to the reaction temperature are significantly decreased.

In one embodiment of the present invention, the process for producing hydrogen cyanide is practiced by directing a gaseous feed stream through the inlet of the reactor and into a plenum within the reactor. This feed stream is then directed from the plenum through the inside portion of a plurality of feeding tubes. The feeding tubes extend through a gas impermeable barrier such that the entrance end of the feeding tubes is located within the plenum and the exit end of the feeding tubes is positioned either within a matrix bed of heat resistant materials that is located within the reactor or within a void located adjacent to the matrix bed within the reactor at a position remote from the gas impermeable barrier. In a preferred embodiment, the feeding tubes are packed with heat resistant matrix materials to enhance heat transfer. A reaction temperature of at least about 800° C. is maintained within at least a portion of the reactor and the methane and ammonia present in the feed stream are heated to that temperature for the reaction to produce a product gas comprising hydrogen cyanide. The product gas stream is passed around the outside portion of the feeding tubes and then exits the reactor through the reactor outlet. Thus, the product gas stream is used to recuperatively pre-heat the feed stream that is traversing through the inside portion of the feeding tubes.

In another embodiment, the feed stream comprising methane and ammonia is fed into the inlet of a matrix bed reactor and through a feed tube or a feed annulus within the reactor. The feed stream is directed into and through the matrix bed of heat resistant materials located within the reactor. A reaction temperature of at least about 800° C. is maintained within a portion of the matrix bed. The methane is reacted with the ammonia to form a product gas stream containing hydrogen cyanide. The flow of the gas streams within the reactor are such that the product gas stream flows in a countercurrent fashion to the direction of the incoming feed stream within the reactor, and the product gas stream subsequently flows out of the reactor through the reactor outlet. Thus, the product gas stream is used to recuperatively pre-heat the feed stream.

The matrix bed of heat resistant materials functions as a heat sink or heat transfer medium to conduct heat from a heating means associated with the reactor and to transfer that heat to the reactant gases. The heat resistant materials also function to transfer heat from the product gases to the incoming reactant gases. In a preferred embodiment, the heat supplied to the reactor is supplied by way of electric resistance heaters.

The reaction is preferably conducted at relatively high temperatures and relatively low pressures. Thus, the temperature of the reaction is at least about 800° C. and preferably at least about 1000° C. The pressure within the reactor is generally below about 2 atm, preferably below about 1 atm, and more preferably below about 0.5 atm. The equilibrium of the reaction favors the yield and concentration of hydrogen cyanide at higher reaction temperatures and lower pressures.

The present invention also provides a recuperative matrix bed reactor that is heated by way of electrical heaters located within the reactor. The reactor has a reactor inlet for a feed stream and a reactor outlet for a product stream. A portion of the reactor contains a matrix bed of heat resistant material located between the reactor inlet and the reactor outlet. A plenum is located between the reactor inlet and a gas impermeable barrier, where the gas impermeable barrier is located between the matrix bed and the plenum. A plurality of feeding tubes are located within the reactor, the feeding tubes having an inside portion, an outside portion, an entrance end, and an exit end, with the feeding tubes extending through the gas impermeable barrier such that the entrance end of the feeding tubes is located within the plenum and the exit end of the feeding tubes is positioned either within the matrix bed of heat resistant material or within a reactor void located adjacent to the matrix bed within the reactor at a position remote from the gas impermeable barrier. Unique to the design of the reactor is the presence of electric heating means for heating the matrix bed, the electric heating means being disposed within the reactor. To protect the electric heating means from the gases within the reactor a gas impermeable barrier is located between the matrix bed of heat resistant material and the electric heating means.

BRIEF DESCRIPTION OF THE FIGURES

FIG. 6 is a partial cross-sectional view of another embodiment of a reactor that can be used for the production of hydrogen cyanide in accordance with the present invention.

FIG. 7 is a partial cross-sectional view of another embodiment of a reactor that can be used for the production of hydrogen cyanide in accordance with the present invention.

DETAILED DESCRIPTION OF THE INVENTION

The present invention provides processes for the synthesis of hydrogen cyanide (HCN) within a reactor that contains a packed bed of heat resistant matrix materials. Hydrogen cyanide can be economically produced by the use of such a reactor because the gaseous reactants, namely methane ($CH_4$) and ammonia ($NH_3$) are driven to equilibrium quickly and efficiently. Further, in a preferred embodiment, the gaseous products are used to preheat the gaseous reactants within the reactor itself, thereby dramatically reducing the cost of heating the reactants to the reaction temperature.

Figure 1:
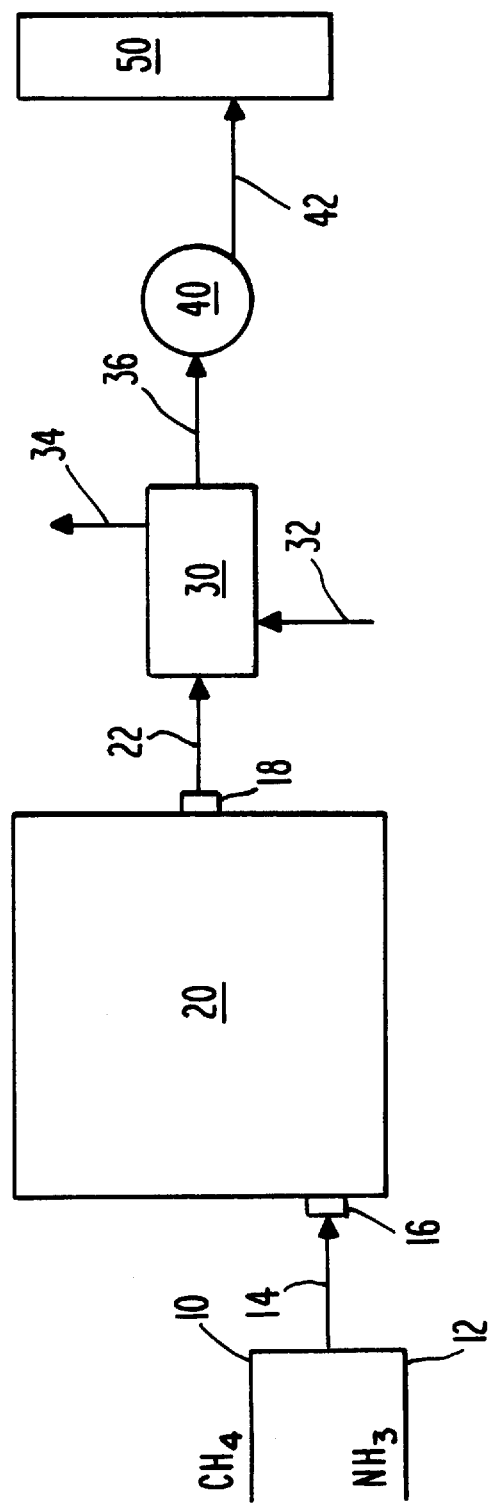
FIG. 1 is a schematic process diagram depicting one embodiment of the process of the present invention.

One example of the basic process flow diagram for the present invention is shown in FIG. 1. The reactants for the synthesis of hydrogen cyanide are methane and ammonia. Methane is transferred through line 10 and ammonia is transferred through line 12 to the inlet 16 of the reactor 20. Preferably, methane from line 10 is mixed with ammonia from line 12 to form a feed stream transferred to the reactor 20 via line 14. However, in another embodiment, the separate methane and ammonia reactants in lines 10 and 12, respectively, can be introduced into the reactor 20 without mixing together prior to entering the reactor 20.

The efficiency of the synthesis of hydrogen cyanide is increased by using a higher concentration of the primary reactants, methane and ammonia, in the feed stream fed into the reactor. Thus, it is advantageous to use a feed stream that contains at least 50% by volume methane and ammonia. In most situations the concentration of methane and ammonia in the feed stream is at least 80% by volume, preferably at least 90% by volume, and more preferably at least 95% by volume. The molar ratio of methane:ammonia to be fed into the reactor can range from about 0.1:1 to about 10:1, preferably between about 0.5:1 to about 2:1, more preferably between 0.9:1 to 1.1:1. The molar ratio can be adjusted depending on the particular content of the hydrogen cyanide and unreacted products and/or by-products in the product stream exiting the reactor (via line 22). For instance, generally the yield, defined as [(moles of hydrogen cyanide in the product stream)/(moles total nitrogen in the product stream)×100%] can be increased by increasing the methane concentration in the feedstream, but the concentration of hydrogen cyanide in the product stream may not be optimized. Also, generally, the concentration of hydrogen cyanide can be increased in the product stream by using an equilmolar proportion of methane:ammonia, but the yield may not be optimized. Thus, a balance must be struck based on the economies of the reactants and the cost associated with separating the hydrogen cyanide from the other components present in the product stream.

The reaction of methane with ammonia to form hydrogen cyanide achieves an equilibrium that favors the concentration and yield of hydrogen cyanide at higher temperatures and lower pressures. As shown in FIG. 1, the methane and ammonia reactants enter into the reactor 20 and are heated therein to the process or reaction temperature. In the present invention, the reaction temperature is at least 800° C., preferably at least about 1000° C., and more preferably at least about 1100° C. In most instances the reaction temperature will be maintained below about 1900° C., more preferably below about 1500° C. An optimum temperature range to which the reactants are to be heated within the reactor 20 is believed to be between about 1150°–1250° C. The operating pressure for the reactor 20 is advantageously maintained at the lowest pressure that is economically practicable. The process pressure within the reactor is below 10 atmospheres (atm), more commonly below about 3 atm, preferably below about 2 atm, more preferably below about 1 atm, and even more preferably below about 0.5 atm. Generally, the process pressure will be in the range of between about 0.001 and about 10 atmospheres (atm), preferably between about 0.001 and about 2 atm, and more preferably between about 0.01 and about 1 atm. These preferred ranges are dependent upon such factors as the cost to heat the reactants to the reaction temperature, the costs of the reactants, the costs associated with reducing the pressure within the reactor, and the costs associated with separating the hydrogen cyanide from the product gas stream.

Figure 2:
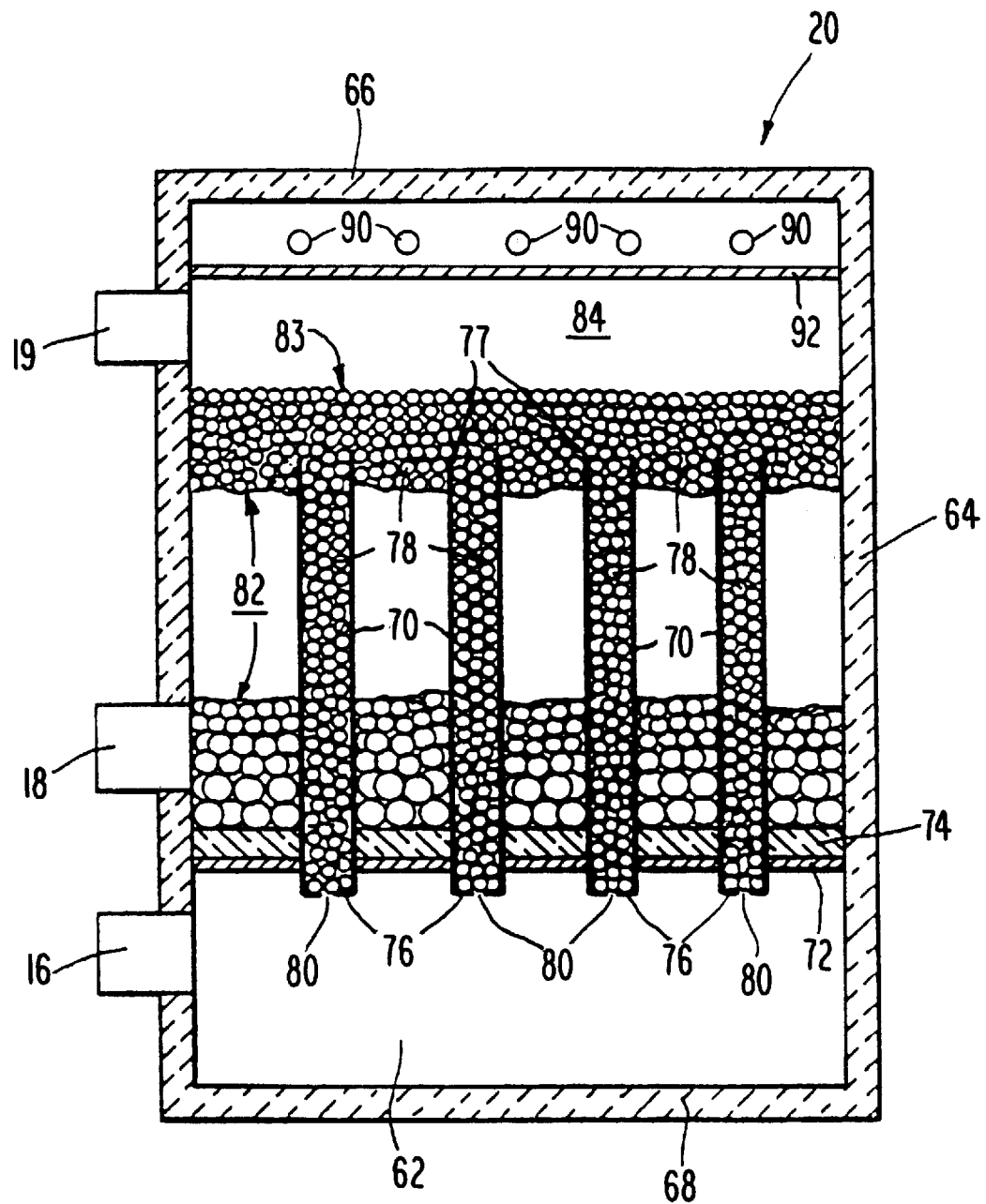
FIG. 2 is a partial cross-sectional view of one embodiment of a reactor that can be used for the production of hydrogen cyanide in accordance with the present invention.

The reactor 20 used for synthesizing the hydrogen cyanide contains a packed bed of heat resistant matrix material. A preferred embodiment of the reactor 20 is shown in FIG. 2 where the reactor 20 is designed to recuperatively preheat the incoming feed stream to effectively lower the costs associated with raising the temperature of the incoming feed stream to the reaction temperature.

The walls 64 and roof 66 of the reactor 20 are made of an insulating heat-resistant material such as firebrick, castable refractory, insulating fiber modules, or a heat-resistant steel alloy. The reactor 20 is typically encased in steel. The inner surface of the steel may be protected by an appropriate corrosion-resistant material, such as an elastomer or a tarlike coating. A castable refractory material such as Kast-O-Lite from A. P. Green Industries also may be used to seal the bottom of the reactor 68.

The inlet 16 of the reactor 20 leads to an inlet plenum 62. A number of feedtubes 70 extend through an impermeable, rigid tubesheet 72, which is preferably made of steel or metal alloy, and a heat resistant ceramic insulating barrier 74 at the roof of the plenum 62. The tubesheet 72 provides mechanical support for the tubes 70. The pressure of the gases within the inlet plenum 62 will be slightly higher than the pressure within the feedtubes 70.

The transfer of heat within the reactor 20 is enhanced when the inside portion of the feedtubes 70 are packed with matrix materials 78. However, the feedtubes 70 need not be packed with these materials. As shown in FIG. 2, the lower ends of the feedtubes 70 are provided with caps 76, or tother means such as a perforated plate, to retain matrix materials 78 inside the tubes 70. The caps 76 are provided with orifices 80 to permit the flow of the feed stream gases from the plenum 62 into the tubes 70. The lowermost two or three layers of matrix packing 78 inside the tubes 70 are preferably larger than the remaining matrix layers above, to diminish the possibility that small matrix materials could occlude the orifices 80. In addition, the size and shape of the matrix materials 78 within the tubes 70 may differ from that of the matrix materials 78 in the surrounding matrix bed 82 located around the feedtubes 70 to compensate for certain process conditions, such as heat transfer properties between the matrix materials themselves and between the matrix material 78 and the tubes 70, and comparative pressure drops within the reactor 20. The upper ends of the feedtubes 70 may be secured to each other and to the walls 64 to provide extra mechanical strength. The upper ends 77 of the feedtubes 70 can terminate either within the matrix bed 82 or in the void space 84 located between the top 83 of the matrix bed 82 and the barrier 92 that separates the heating elements 90 from the void space 84.

In a preferred embodiment, the internal diameter of the feedtubes 70 are in the range of 0.25 to 30 inches (0.64 to 76.2 cm), more preferably in the range of 0.75 to 12 inches (1.9 to 30.5 cm), and most preferably 1.5 to 6 inches (3.8 to 15.2 cm). They are preferably installed in a regularly-spaced manner with the spacing-to-diameter ratio preferably 1 to 10, more preferably 1.5 to 5, and most preferably 2 to 4. The length of the tubes 70 is preferably 1 to 100 times the internal diameter of the tubes 70 themselves, more preferably 1 to 30 times the internal diameter of the tubes 70, and most preferably 5 to 25 times the internal diameter of the tubes 70. The tubes 70 are preferably welded or press-rolled to the tubesheet 72. The thermal conductivity of the tube material is preferably greater than 10 W/m-K, and most preferably greater than 30 W/m-K. In addition to enhancing the heat transfer properties, the preferred tube sizes and spacings also provide for better tube mechanical integrity and less costly welding and attachment operations than typical for a conventional heat exchanger.

The barrier 74 supports a matrix bed 82 of heat-resistant matrix material 78. Typically, the matrix bed 82 according to the present invention will comprise a ceramic, which may be randomly packed or structurally packed. Preferred random packing comprises ceramic balls that may be layered. Generally, the ceramic balls are useful if they have a diameter from about 0.0625 to 3 inches (0.159–7.62 cm), preferably about 0.75 inch (1.9 cm). Another useful configuration is the use of random ceramic saddles typically from 0.0625 to 3 inch (0.159–7.62 cm) nominal size, preferably about 0.5 to 1.5 inches (1.27–3.81 cm) nominal size. Other useful packing materials are ceramic pall rings and ceramic raschig rings with diameters from about 0.0625 to 3 inches (0.159–7.62 cm), and preferably from about 0.5 to 1.5 inches (1.27–3.81 cm).

A ceramic foam material may also be utilized as either part or for use as the entire matrix bed 82. Typical foam material may be utilized that has a void fraction of 10 to 99%, preferably 75 to 95%, and most preferably about 90%. The pore sizes in any preferred ceramic foam material will be about 0.1 to 1,000 pores per inch (0.04 to 400 pores per cm), preferably about 1 to 100 pores per inch (0.4 to 40 pores per cm), and most preferably about 10 to 30 pores per inch (4 to 12 pores per cm).

Other shapes of ceramic material may be utilized as the matrix materials 78, such as honeycomb shape ceramic. Instead of a ceramic, the heat-resistant material used to form the bed may also be a metal, which may be randomly packed or may have a structured packing.

Generally, the void fraction of the matrix bed 82 will be between 0.3 and 0.99. In addition, the material in the matrix bed 82 will typically have a specific surface area ranging from 40 $m^2/m^3$ to 1040 $m^2/m^3$.

The preferred matrix materials 78, such as ceramic materials, are materials that are considered to be "inert" or "non-catalytic" in nature with respect to the synthesis of hydrogen cyanide. By this it is meant that the materials themselves do not significantly effect the reaction rate for the formation of hydrogen cyanide at given reaction conditions in the same manner as do catalytic materials, such as platinum catalytic materials used in prior hydrogen cyanide processes. The primary function of the non-catalytic ceramic matrix materials is to act as a heat sink to transfer thermal energy to the reactants to raise the temperature of the reactants to the reaction temperature at which they can react in a gas phase reaction as opposed to a catalyzed surface reaction. These materials also function to transfer heat from the product gases to the incoming reactants.

As shown in FIG. 2, the heat-resistant matrix material 78 of the matrix bed 82 fills the region between the barrier 74 and an upper reactor void 84 near the top of the reactor 20, and these materials 78 also fill the interior of the feedtubes 70. The outlet 18 has heat-resistant screens (not shown) to retain the matrix material 78 inside the reactor.

During the operation of the present invention utilizing the reactor design set forth in FIG. 2, the reactants enter the reactor 20 through the inlet 16 and enter into the plenum 62. The reactants then flow through the orifices 80 at the ends of the feedtubes 70. The reactants traverse through the inside of the feedtubes 70, and pass around the matrix materials 78 within the feedtubes 70. As discussed, the temperature at which methane and ammonia are reacted to form hydrogen cyanide within the reactor 20 is at least about 800° C., and the reaction is endothermic. Thus, heat must be supplied to the reactor to raise the temperature of the reactants to the reaction temperature. The reactants can be heated by various means well known to those of skill in the art. In the embodiment shown in FIG. 2, the heat is supplied by way of electric heating elements 90 located at a point proximate to the upper void space 84, which is adjacent to the top 83 of the matrix bed 82.

The electric heating elements 90 can be separated from the gaseous environment within the reactor 20 by means of a gas impermeable barrier 92, which can be constructed of various materials such as high temperature alloys that are resistant to reducing conditions and/or carburization resistant alloys. Due to the thermal expansion associated with barrier 92, a stress relieved protection plate can be used for the barrier 92. The barrier 92 is sealed to the circumference of the reactor at the reactor wall 64. The barrier 92 can be designed to expand in a controlled fashion during the use of the reactor at high temperatures. One way for accomplishing this is to construct the barrier 92 to have a wave-like cross-section so that during thermal expansion the peaks of the waves within the barrier 92 expand in a perpendicular fashion from the barrier 92 thus allowing the barrier 92 to expand in a fashion similar to a spring being compressed. By supplying the heat to a point proximate to the top 83 of the matrix bed 82, the maximum matrix bed temperature will be at or near the top 83 of the matrix bed 82 and the production of hydrogen cyanide can predominately take place in this region of the reactor to most efficiently conserve energy.

The electric heating elements 90 can be any type of conventional resistive heating elements, such as silicon carbide or nickel chromium heating elements. These heating elements 90 can be used at the beginning of the process to heat the matrix bed 82, particularly the area near the top 83 of the matrix bed 82, to the desired reaction temperature. During the preheating process, an inert gas, such as nitrogen can be flown through the reactor 20 to improve heat transfer from the heating elements 90 to the matrix materials 78. The heat for the reactor 20 can also be supplied by other types of heating systems. For example, the heating elements 90 can be replaced by a natural gas heating system where the natural gas would be fired into the area shown containing the heating elements 90. A utility port 19 can be incorporated into the reactor 20 to gain access to the void space 84. The preheating of the matrix bed 82 could also be accomplished by forcing a heated gas through the matrix bed from utility port 19 through the outlet 18.

The methane and ammonia react within the reactor 20 to form a gaseous product stream containing hydrogen cyanide and various by-products such as hydrogen and nitrogen, along with unreacted methane and ammonia. The product stream flows through the matrix bed 82 and is removed from the reactor 20 through the reactor outlet 18. A portion of the heat possessed by the product stream can be advantageously recovered within the reactor 20. As shown in FIG. 2, the product stream gases flow down past the outside of the feedtubes 70 and thereby heat the feedtubes 70 and the matrix materials 78 contained therein by forced convection. Although radiant heating also contributes to heat transfer from the product gases to the matrix bed 82 and to the feedtubes 70, this contribution is generally small compared to that for the convective heat transfer.

The amount of heat that can be extracted from the product stream gases before they exit the reactor 20 depends on various design parameters of the reactor 20 and its operation. For instance, the number, length, diameter, and spacing of the feedtubes 70, along with the reaction temperature, the feed rate of the feed stream, and the exit temperature of the product stream all contribute to the amount of heat extracted from the product stream. The internal exchange of heat from the product stream to the incoming feed stream is also beneficial in that it inhibits the reverse reaction of hydrogen cyanide to methane, ammonia, or other compounds. The process of the present invention is preferably conducted such that the temperature of the product stream gases exiting the reactor 20 through outlet 18 is below about 800° C., preferably below about 600° C., and more preferably below about 500° C. In this regard, it is beneficial to reduce the temperature of the product gas by at least 300° C., preferably by at least 400° C., and more preferably by at least 500° C. from the peak reaction temperature found within the reactor 20 prior to exiting the product gas from the reactor 20.

Figure 3:
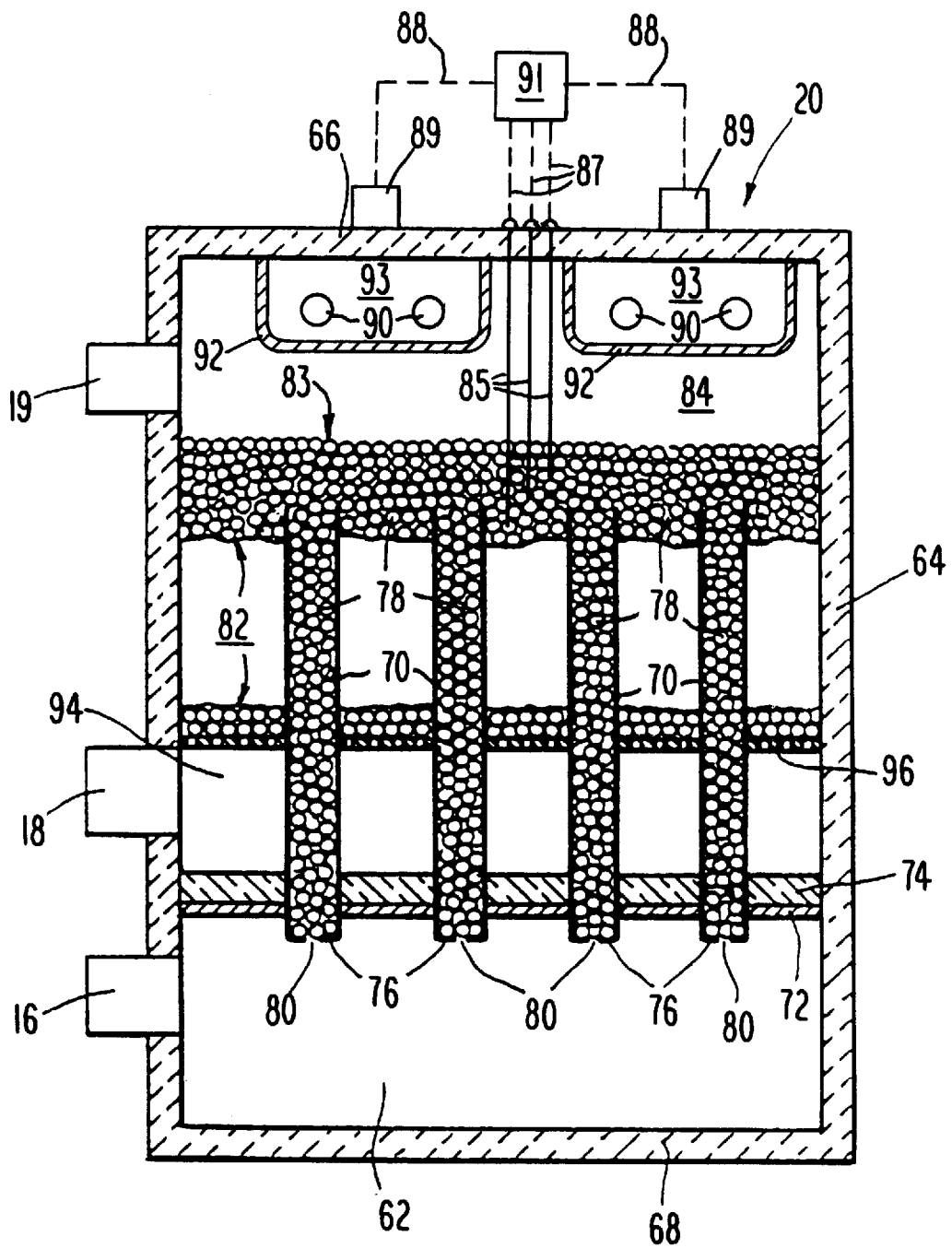
FIG. 3 is a partial cross-sectional view of another embodiment of a reactor that can be used for the production of hydrogen cyanide in accordance with the present invention.

An outlet plenum, where pressure drop per unit distance traversed by the gas is lower than in the matrix, may be used to enhance the uniformity of distribution of the gases through the matrix. The reactor 20 design can be modified as shown in FIG. 3, which shows a similar reactor design to that shown in FIG. 2, except that an outlet plenum 94 is provided to separate the outlet 18 from the matrix bed 82. A grid 96, such as a ceramic or metal alloy that is gas permeable is used to support the matrix bed 82.

The electric heating elements 90 shown in FIG. 3 are contained within protective tubes 93 formed by the impermeable gas barrier 92 and the reactor roof 66. Such tubes 93 can be completely enclosed by barrier 92 and located near the top of the reactor 20, located near or proximate to the top 83 of the matrix bed 82, located around the upper portion of the wall 64 near the top 83 of the matrix bed 82, or sunk into the matrix bed 82, preferably near the top 83 of the matrix bed 82. The protective tubes 93 can be of any geometric shape or design such as round or square, symmetric or not, wide or narrow, long or short, etc.

The temperature of the matrix bed 82 can be monitored by means of thermocouples 85 sunk into the matrix bed 82 at various positions. The output from the thermocouples can be sent to a computerized process control unit 91 via lines 87 and used to control the amount of heat supplied to the reactor 20 by the heating elements 90. As shown in FIG. 3, the output from the control unit 91 regulates the heat control unit 89 for the heating elements 90 via lines 88.

Figure 4:
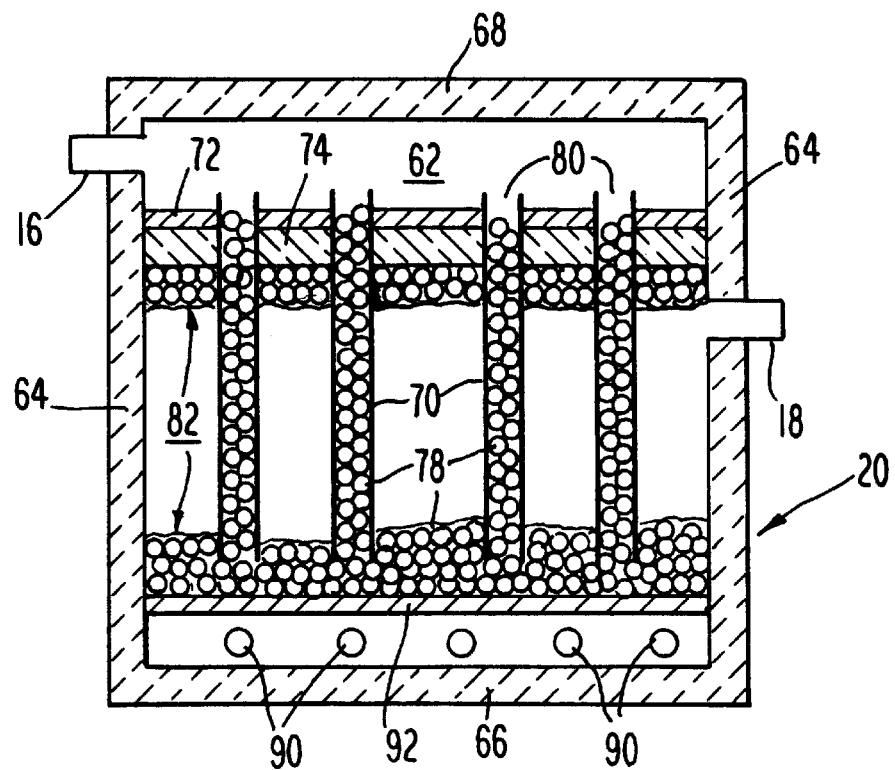
FIG. 4 is a partial cross-sectional view of a further embodiment of a reactor that can be used for the production of hydrogen cyanide in accordance with the present invention.

In a related embodiment, shown in FIG. 4, the reactor 20 design is similar to that as shown in FIG. 2, except that the reactor is in a top-down configuration. In this embodiment, the reactants enter through the inlet 16, flow into the plenum 62, and through the orifices 80 of the feeding tubes 70. The reactants then flow through the inside of the feeding tubes 70, flowing around the matrix materials 78 within the tubes 70. The reactants exit the ends of the feeding tubes 70 into the matrix bed 82. The matrix bed 82 is again heated by some heating means, in this case the heating elements 90. The matrix bed 82 is supported by and separated from the heating elements 90 by barrier 92. The reactants will reach the reaction temperature and react to form HCN either within the tubes 70 or within the matrix bed 82. As in the other designs, the product gases are flown past the outsides of the feeding tubes 70 prior to exiting the reactor 20 to preheat the incoming reactants and to substantially lower the temperature of the product gases from the reaction temperature before those gases exit the reactor 20 via outlet 18. The embodiment depicted in FIG. 3 is preferred relative to the one depicted in FIG. 4 because the barrier 92 shown in FIG. 4 must be designed to support the weight of the matrix bed and provide adequate heat conductivity to the matrix bed.

Figure 5:
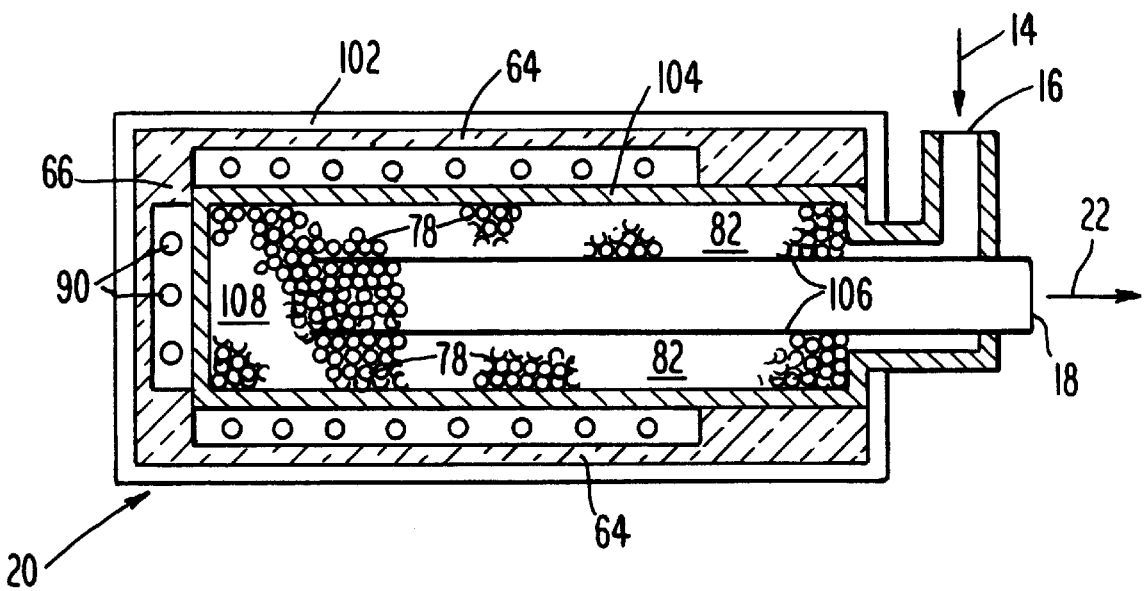
FIG. 5 is a partial cross-sectional view of another embodiment of a reactor that can be used for the production of hydrogen cyanide in accordance with the present invention.

In a different design for the reactor 20, shown in FIG. 5, the reactor shell 104, made from high temperature alloys such as those used to construct barrier 92 (FIG. 2), surrounds the matrix bed 82 that contains a packing of matrix materials 78. The reactor shell is shown to be surrounded by reactor walls 64 and roof 66. In FIG. 5 is shown the reactor casing 102, typically made of steel. The matrix bed 82 can be heated by heating elements 90, which can be controlled by a control system (not shown) such as the one shown in FIG. 3, which is responsive to the temperatures monitored within the matrix bed 82 by thermocouple probes (not shown) embedded into the matrix bed 82. In the particular reactor 20 shown in FIG. 5, the incoming feed gases flow through line 14 into the inlet 16 and around the outside of a reactor tube 106, which can be made of a high temperature alloy similar to that used for the reactor shell 104. The reactants are heated to the reaction temperature by passing through the matrix bed 82 and preferably reach that temperature at the end 108 of the matrix bed 82 at a point distant from the outlet 18 of the reactor 20. Thus, it is preferred that the reaction to form HCN take place substantially near the end 108 of the matrix bed 82. The heating elements 90 can be variably controlled to provide greater amounts of heat near the end 108 of the matrix bed 82 to profile the temperature of the matrix bed 82 along the flow path of the incoming gases. The formed product gases will then flow down through the inside of reactor tube 106, which is also preferably packed with matrix materials 78. The countercurrent flow of the product gases with respect to the incoming feed stream gases that flow around the outside of the reactor tube 106 will result in the heating of the feed stream gases and the cooling of the product gases.

In another embodiment, the reactor 20 design shown in FIG. 5 can be used, but the flow of gases reversed such that the feed stream would flow into the reactor through the inside of reactor tube 106 and the product gas stream would exit the reactor 20 by flowing past the outside of the reactor tube 106. The reactor inlet 16 and outlet 18 would then be switched in this embodiment. The heating elements 90 may also be advantageously positioned on the outside of the reactor tube 106 in this embodiment. Another similar reactor design that can be used in the process of the present invention is shown in U.S. Pat. No. 4,823,711 to Kronebeerger et al., which is hereby incorporated by reference in its entirety.

A further embodiment is shown in FIG. 6 the reactor shell 104, made from high temperature alloys such as those used to construct barrier 92 (FIG. 2), surrounds the matrix bed 82 that contains a packing of matrix materials 78. The size of the matrix materials 78 can vary as shown in this embodiment. The reactor shell is shown to be surrounded by reactor walls 64 and roof 66. In FIG. 6 is shown the reactor casing 102, typically made of steel. The matrix bed 82 can be heated by heating elements 90, which can be controlled by the control unit 91, such as the one shown in FIG. 3, which is responsive to the temperatures monitored within the matrix bed 82 by thermocouple probes 85 embedded into the matrix bed 82. In the particular reactor 20 shown in FIG. 6, the incoming feed gases flow through line 14 into the inlet 16 and around through the matrix bed 82 within the reactor.

The reactants are heated to the reaction temperature by passing through the matrix bed 82. The formed product gases will then flow down through an optional quenching section 110 of the reactor that has a different insulation forming the roof section 66 to lower the temperature of the product gases, if desired. This embodiment of the invention does not utilize an in-reactor heat exchange between the incoming reactant gases and the product gases. However, such a heat exchanger can be located externally of the reactor 20.

A reactor 20 embodiment that is similar to that shown in FIG. 6 is shown in FIG. 7. In this embodiment, the direction of flow of the gases is reversed from that shown in FIG. 6. In this embodiment, the matrix bed 82 runs the entire length of the reactor 20. The heating elements are located in the front portion of the reactor 20 and the latter portion of the reactor has insulation material 67, which can be different from that used in the lower portion of the reactor to allow for heat to dissipate, if desired.

Referring back to FIG. 1, once the product stream is removed from the reactor 20 through the outlet 18, it must be processed to further concentrate the HCN for most uses. It is preferred to first remove additional heat from the product gas to recover the value of that heat. Thus, as shown in FIG. 1, the product gas is directed through a heat exchanger 30 by flowing through line 22. The heat exchanger 30 can be designed from conventional non-contact (dry) gas phase coolers. In one embodiment, the cooling fluid that flows into the heat exchanger 30 via line 32 and exits via line 34 can be one and/or both of the primary reactants for the process. For example, line 32 could be line 10, 12, and/or 14 with line 34 being in flow communication with the inlet 16 to the reactor 20.

After cooling the product gas, it exits the heat exchanger 30 via line 36 and flows through a means for creating a flow through the reactor 40, such as a vacuum pump or an eductor. Various eductors can be used for this purpose, such as air, steam, or water eductors. This unit 40 will pull a vacuum on the reactor 20 to cause the gases to flow through the reactor 20. In certain embodiments, the unit 40 could be replaced by a blower located along line 14 or along lines 10 and 12.

The product gas is preferably separated to further concentrate the HCN for most industrial applications. As shown in FIG. 1, the process gas flows through line 42 and is directed into a separator 50, such as any conventional separation system known to be useful with HCN production.

Various modifications within the level of skill of those in the art can be made to the processes of the present invention. For instance, catalytic materials for the production of HCN can be incorporated either randomly or selectively within the matrix bed 82 and/or within the feedtubes 70 or reactor tube 106 as shown in the various described embodiments of the invention. The catalytic material can be placed at the area in the matrix bed 82 where the reaction temperature is at its peak to optimize the efficiency of the reaction. Such catalytic materials include a base catalyst support that is impregnated or otherwise associated with a catalytic element or compound, such as platinum.

What is claimed is:

1. A process for producing hydrogen cyanide, comprising:
   (a) directing a gaseous feed stream comprising methane and ammonia to an inlet of a matrix bed reactor, wherein the concentration of the methane and ammonia is at least 50% by volume of the feed stream;
   (b) directing the feed stream into a plenum within said reactor;

(c) directing the feed stream from the plenum through an inside portion of a plurality of feeding tubes, the feeding tubes having an entrance end and an exit end, the feeding tubes extending through a gas impermeable barrier such that the entrance end of the feeding tubes is located within the plenum and the exit end of the feeding tubes is positioned either within a matrix bed of heat resistant materials that is located within the reactor or within a void located adjacent to the matrix bed within the reactor at a position remote from the gas impermeable barrier;

(d) maintaining a reaction temperature of at least 800° C. within at least a portion of the reactor;

(e) reacting the methane with the ammonia to form a product gas stream comprising hydrogen cyanide; and (f) exiting the product gas stream from the reactor by passing the product gas around the outside portion of the feeding tubes and through a reactor outlet, whereby the feed stream is recuperatively preheated within the feeding tubes by the thermal energy possessed by the product gas stream.

2. The process of claim 1 wherein the reaction temperature is at least 1000° C. and the temperature of the product gas exiting the reactor is below about 800° C.

3. The process of claim 1 further comprising providing heat to the matrix bed of heat resistant materials within the reactor.

4. The process of claim 3 wherein the heat is provided by electrical heaters positioned within the reactor.

5. The process of claim 1 wherein at least a fraction of the hydrogen cyanide is produced within the feeding tubes.

6. The process of claim 1 wherein at least a fraction of the hydrogen cyanide is produced outside of the feeding tubes.

7. The process of claim 1 wherein the reaction temperature is at least 1100° C. and the temperature of the product gas exiting the reactor is below about 800° C.

8. The process of claim 7 wherein the temperature of the product gas exiting the reactor is below about 600° C.

9. The process of claim 1 wherein the concentration of hydrogen cyanide in the product gas stream exiting the reactor is at least about 15% by volume.

10. The process of claim 1 wherein the pressure within the reactor is below about 1 atmosphere.

11. The process of claim 1 wherein the pressure within the reactor is below about 0.5 atmospheres.

12. A process for producing hydrogen cyanide, comprising:
(a) providing a matrix bed reactor comprising:
(i) a reactor inlet for a feed stream and a reactor outlet for a product stream;
(ii) a portion of the reactor containing a matrix bed of heat resistant material located between the reactor inlet and the reactor outlet;
(iii) a plenum located between the reactor inlet and a gas impermeable barrier, where the gas impermeable barrier is located between the matrix bed and the plenum;
(iv) a plurality of feeding tubes, the feeding tubes having an inside portion, an outside portion, an entrance end, and an exit end, the feeding tubes extending through the gas impermeable barrier such that the entrance end of the feeding tubes is located within the plenum and the exit end of the feeding tubes is positioned either within the matrix bed of heat resistant material or within a reactor void located adjacent to the matrix bed within the reactor at a position remote from the gas impermeable barrier; and (v) means for heating the matrix bed;

(b) directing a gaseous feed stream comprising methane and ammonia through the reactor inlet and into the plenum, wherein the concentration of the methane and ammonia is at least 80% by volume of the feed stream;

(c) directing the feed stream from the plenum through the inside portion of the plurality of feeding tubes;

(d) activating the heating means so as to maintain a reaction temperature of at least 800° C. within at least a portion of the reactor;

(e) reacting the methane with the ammonia to form a product gas stream comprising hydrogen cyanide; and (f) exiting the product gas stream from the reactor through the reactor outlet, whereby the product stream flows in a countercurrent fashion along the outside portion of the feeding tubes prior to exiting the reactor to thereby preheat the feed stream flowing through the inside portion of the feeding tubes.

13. The process of claim 12 wherein the reaction temperature is at least 1000° C. and the temperature of the product gas exiting the reactor is below about 800° C.

14. The process of claim 13 wherein the temperature of the product gas exiting the reactor is below about 600° C.

15. The process of claim 13 wherein the concentration of hydrogen cyanide in the product gas stream exiting the reactor is at least about 15% by volume.

16. The process of claim 13 wherein the pressure within the reactor is below about 1 atmosphere.

17. The process of claim 13 wherein the pressure within the reactor is below 0.5 atmospheres.

18. A process for the production of hydrogen cyanide, comprising
(a) directing a gaseous feed stream comprising methane and ammonia to an inlet of a matrix bed reactor, wherein the concentration of the methane and ammonia is at least 80% by volume of the feed stream;
(b) directing the feed stream into a matrix bed of heat resistant materials that is located within the reactor;
(c) maintaining a reaction temperature of at least 800° C. within at least a portion of the matrix bed;
(d) reacting the methane with the ammonia to form a product gas stream comprising hydrogen cyanide; and
(e) exiting the product gas stream from the reactor by flowing the product gas stream in a countercurrent fashion to the direction of flow of the incoming feed stream within the reactor, and subsequently flowing the product gas stream through a reactor outlet, whereby the feed stream is recuperatively preheated within the reactor by the thermal energy possessed by the product gas stream.

19. The process of claim 18 wherein the reaction temperature is at least 1000° C. and the temperature of the product gas exiting the reactor is below about 800° C.

20. The process of claim 18 wherein the temperature of the product as exiting the reactor is below about 600° C.

21. The process of claim 18 wherein the concentration of hydrogen cyanide in the product gas stream exiting the reactor is at least about 15% by volume.

22. The process of claim 18 wherein the pressure within the reactor is below about 1 atmosphere.

23. The process of claim 18 wherein the pressure within the reactor is below 0.5 atmospheres.

24. A process for the production of hydrogen cyanide, comprising
(a) directing a gaseous feed stream comprising methane and ammonia to an inlet of a matrix bed reactor, wherein the concentration of the methane and ammonia is at least 80% by volume of the feed stream;

(b) directing the feed stream into a matrix bed of non-catalytic, heat resistant materials that is located within the reactor;

(c) maintaining a reaction temperature of at least 800° C. and a reaction pressure below 1 atmosphere within at least a portion of the matrix bed;

(d) reacting the methane with the ammonia to form a product gas stream comprising hydrogen cyanide; and (e) exiting the product gas stream from the reactor.

25. The process of claim 24 wherein the pressure within the reactor is below 0.5 atmospheres.

* * * * *